United States Patent
Mishra et al.

(10) Patent No.: US 11,620,540 B2
(45) Date of Patent: Apr. 4, 2023

(54) AUTOMATED ACTION PERFORMANCE USING NETWORK DATA IN ASSOCIATION WITH MACHINE LEARNING AND BIG DATA TECHNIQUES

(71) Applicant: Verizon Patent and Licensing Inc., Arlington, VA (US)

(72) Inventors: Siddharth Mishra, San Francisco, CA (US); Andy Pease, Bodega, CA (US); Jeffrey R. Stribling, Menlo Park, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1386 days.

(21) Appl. No.: 15/801,008

(22) Filed: Nov. 1, 2017

(65) Prior Publication Data

US 2019/0012602 A1    Jan. 10, 2019

Related U.S. Application Data

(60) Provisional application No. 62/529,774, filed on Jul. 7, 2017.

(51) Int. Cl.
*G06N 5/02* (2006.01)
*G06N 5/04* (2006.01)
(Continued)

(52) U.S. Cl.
CPC ............. *G06N 5/027* (2013.01); *G06N 5/046* (2013.01); *G06Q 10/10* (2013.01); *G06Q 50/01* (2013.01);
(Continued)

(58) Field of Classification Search
CPC ...... G06Q 10/107; G06Q 10/10; G06Q 50/01; G06Q 30/02; H04L 67/2842; H04L 51/52;
(Continued)

(56) References Cited

U.S. PATENT DOCUMENTS 6,047,310 A * 4/2000 Kamakura ........... G06Q 10/107
  709/201
9,135,559 B1 * 9/2015 Chan .................... G06F 16/248
(Continued)

OTHER PUBLICATIONS

Crunchbase, "Edgar," https://www.crunchbase.com/organization/edgar-2#/entity, May 12 2017, 1 page.
(Continued)

*Primary Examiner* — Viker A Lamardo

(57) ABSTRACT

A device can receive information associated with content that is to be provided to a first set of user devices. The device can receive information associated with a set of rules that identifies a set of conditions for providing the content to the first set of user devices. The device can receive network information associated with a second set of user devices. The device can determine that at least one condition, of the set of conditions identified in the set of rules, is satisfied based on the network information associated with the second set of user devices. The device can determine an action, associated with the content, to be performed based on determining that the at least one condition is satisfied, and can perform the action.

20 Claims, 7 Drawing Sheets

(51) Int. Cl.
*G06N 20/00* (2019.01)
*G06Q 50/00* (2012.01)
*G06Q 10/10* (2012.01)
*H04L 51/52* (2022.01)
*H04L 67/63* (2022.01)
*G06N 5/046* (2023.01)
*H04L 51/04* (2022.01)
*H04W 4/02* (2018.01)
*H04W 4/14* (2009.01)
*G06Q 30/02* (2012.01)
*H04L 67/55* (2022.01)

(52) U.S. Cl.
CPC .............. *H04L 51/52* (2022.05); *H04L 67/63* (2022.05); *G06N 20/00* (2019.01); *G06Q 30/02* (2013.01); *H04L 51/04* (2013.01); *H04L 67/55* (2022.05); *H04W 4/02* (2013.01); *H04W 4/14* (2013.01)

(58) Field of Classification Search
CPC ......... H04L 67/63; H04L 51/04; H04L 67/55; G06N 5/027; G06N 5/046; G06N 20/00; H04W 4/02; H04W 4/14
See application file for complete search history.

(56) References Cited

U.S. PATENT DOCUMENTS

| | | | | |
|---|---|---|---|---|
| 9,514,404 | B1* | 12/2016 | Corrado | G06N 3/084 |
| 9,832,163 | B1* | 11/2017 | Biehn | H04L 51/14 |
| 9,911,129 | B2* | 3/2018 | Meredith | H04W 4/029 |
| 10,225,365 | B1* | 3/2019 | Hotchkies | H04L 67/2842 |
| 10,361,802 | B1* | 7/2019 | Hoffberg-Borghesani | G11B 27/11 |

| | | | | |
|---|---|---|---|---|
| 2014/0129942 | A1* | 5/2014 | Rathod | H04N 21/44222 715/720 |
| 2016/0232548 | A1* | 8/2016 | Grosso | G06Q 30/0283 |
| 2017/0124487 | A1* | 5/2017 | Szeto | G06N 20/00 |

OTHER PUBLICATIONS

Crunchbase, "SocialFlow," https://www.crunchbase.com/organization/socialflow#/entity, May 20, 2017, 1 page.
Buffer, "Save time managing your social media," http://www.bufferapp.com, Feb. 28, 2015, 12 pages.
MeetEdgar, "Like hiring a content manager for a fraction of the cost!," https://meetedgar.com/features/, Jun. 7, 2017, 14 pages.
SocialFlow, "SocialFlow," https://www.youtube.com/watch?v=jaDuR6aJNO8, Mar. 22, 2016, 3 pages.
Quora, "How much revenue is MailChimp doing?" https://www.quora.com/How-much-revenue-is-MailChimp-doing, Feb. 1, 2011, 4 pages.
Erick Schonfeld, "For Eventbrite, Each Facebook Share is Worth $2.52," https://techcrunch.com/2010/10/14/eventbrite-facebook-share/, Oct. 14, 2010, 6 pages.
John Rampton, "7 worthwhile ways to automate social media," http://mashable.com/2016/02/01/automate-social-media/#eXDKuPVZqkqx, Feb. 1, 2016, 9 pages.
Karsten Weide, "Worldwide Advertising Software Revenue Forecast, 2017-2021," https://www.idc.com/getdoc.jsp?containerId=US42470417&, May 2017, 2 pages.
Louis Columbus, "IDC Predicts CMOs Will Drive $32.3B In Marketing Technology Spending By 2018" https://www.forbes.com/sites/louiscolumbus/2015/01/17/idc-predicts-cmos-will-drive-32-3b-in-marketing-technology-spending-by-2018/#2808c30f1f78, Jan. 17, 2015, 4 pages.
Marketo, Inc., "What Is Marketing Automation?," https://www.marketo.com/marketing-automation/, Jan. 27, 2016, 8 pages.
Ray Schultz, "Marketing Automation Will Hit $7.63 Billion by 2025: Report," https://www.mediapost.com/publications/article/301987/marketing-automation-will-hit-763-billion-by-202.html, May 30, 2017, 3 pages.

* cited by examiner

AUTOMATED ACTION PERFORMANCE USING NETWORK DATA IN ASSOCIATION WITH MACHINE LEARNING AND BIG DATA TECHNIQUES

RELATED APPLICATION

This application claims priority under 35 U.S.C. § 119 to U.S. Provisional Patent Application No. 62/529,774, filed on Jul. 7, 2017, the content of which is incorporated by reference herein in its entirety.

BACKGROUND

Big data refers to data sets that are expansive and/or complex, and can also refer to the process of using predictive analytics, user behavior analytics, and/or the like, in association with such data to extract value from the data sets. For example, an entity can utilize big data to identify insights regarding market behavior, capture interest, optimize content delivery, and/or the like.

DETAILED DESCRIPTION OF PREFERRED EMBODIMENTS

Figure 1A:
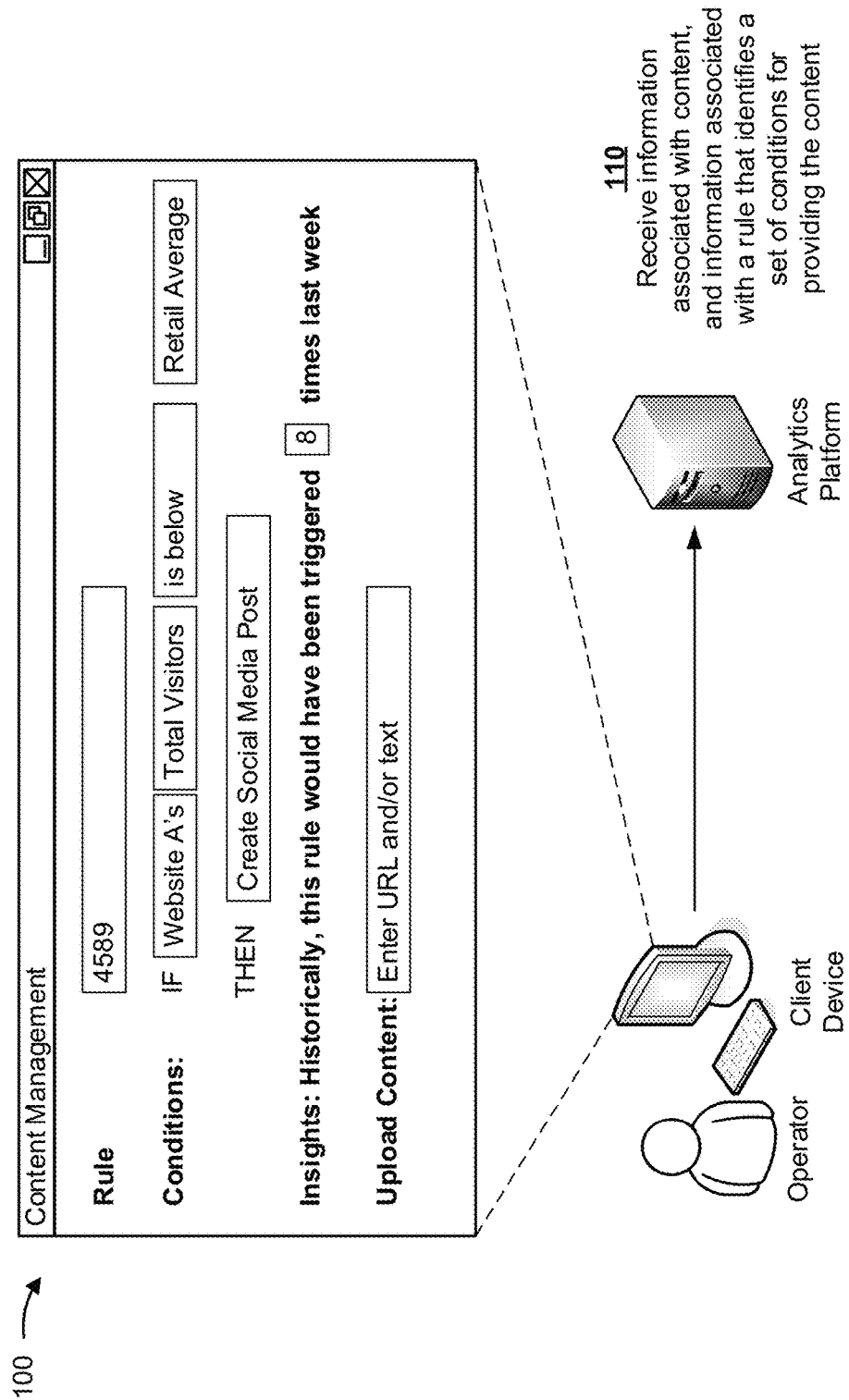
FIGS. 1A-1C are diagrams of an overview of an example implementation described herein.

The following detailed description of example implementations refers to the accompanying drawings. The same reference numbers in different drawings can identify the same or similar elements.

An entity (e.g., a content provider, a business, an organization, a company, and/or the like) might desire to provide content to users (e.g., customers, clients, consumers, and/or the like). For example, the entity might implement a campaign whereby the entity provides targeted content to user devices, Internet of things (IoT) devices, software, platforms, and/or the like. Often, content delivery decisions are performed manually, and are subjective, error-prone, inefficient, and/or the like. For example, an entity might pre-schedule content to be delivered days or weeks in the future, might manually select particular content to be delivered, might manually and repetitively configure content to be delivered, and/or the like.

As such, content management teams might be tasked with identifying when to deliver content, identifying particular content to be delivered, identifying how to react to other entities (e.g., competitors) that are providing content, and/or the like. Additionally, a content management team might not configure content to be delivered based on an underlying trigger. That is, the content management team might statically configure content to be delivered without insight into network traffic and/or consumer behavior.

Often, the content management team might not have access to adequate information on which to base such decision making. As such, the content management team might select particular content that is not of interest to users, that is not applicable to users, and/or the like. In this way, user experience might be inhibited, brand image might be damaged, consumer engagement might be reduced, and/or the like. Additionally, in this way, unnecessary network resources might be consumed by utilizing such network resources to provide content that is not of interest to users.

Some implementations described herein provide an analytics platform that can access real-time network data and implement machine learning and big data techniques to improve the automated performance of actions (e.g., content delivery, notification delivery, account updates, and/or the like). For example, by analyzing real-time network data associated with hundreds, thousands, millions, etc. of entities (e.g., companies, brands, web sites, and/or the like) and thousands, millions, billions, etc. of users, the analytics platform can improve the performance of actions such that user engagement is increased, brand identity is improved, consumer behavior is solicited, and/or the like.

Some implementations described herein provide an analytics platform that enables automated performance of actions (e.g., content delivery, internal account updates, provision of notifications, and/or the like) using real-time network data in association with machine learning and big data techniques. For example, some implementations described herein provide an analytics platform that can receive information associated with rules that are to be used to identify when content is to be delivered, to identify the particular content that is to be delivered, and/or the like.

Additionally, the analytics platform can receive network information, such as network traffic information, demographic information, browsing history information, information associated with external data sources, and/or the like, and execute the rules using the network information. Additionally, the analytics platform can, based on executing the rules and using machine learning techniques, determine an action that is to be automatically performed. For example, an action can correspond to providing content, updating a set of social media accounts, sending an email, sending a short message service (SMS) message, updating an internal account (e.g., associated with a customer relationship management (CRM) platform, a CRM database, and/or the like), and/or the like.

In some implementations, the action can also include identifying particular content that is to be provided to user devices, software, platforms, and/or the like, that is to be uploaded to an application server, and/or the like. For example, the analytics platform can implement machine learning techniques to identify particular content that is likely to be of interest to users, that is likely to elicit particular user behavior, and/or the like. As an example, and as described elsewhere herein, the analytics platform can implement image recognition techniques to identify content that is similar, includes a similar theme, and/or the like, to content that has been viewed by a target demographic, by a set of users responsible for a particular change in state of a network (e.g., website visits, network traffic, and/or the like), and/or the like.

In this way, some implementations described herein enable automated content delivery based on real-time network information. As used herein, real-time can mean substantially concurrently with an underlying event. Some implementations described herein enable automated content delivery of content that is more likely to be of interest to users, is more likely to elicit particular user behavior, and/or the like, than as compared to manual content delivery decision making. As such, some implementations described herein conserve network resources and/or computing device resources by reducing a number of situations where inapplicable content, non-engaging content, and/or the like, is delivered to user devices and/or uploaded to application servers. Additionally, some implementations described herein improve user experience, result in improved user engagement, increase the likelihood of soliciting desired behavior, improve brand identity and recognition, and/or the like.

Figure 1B:
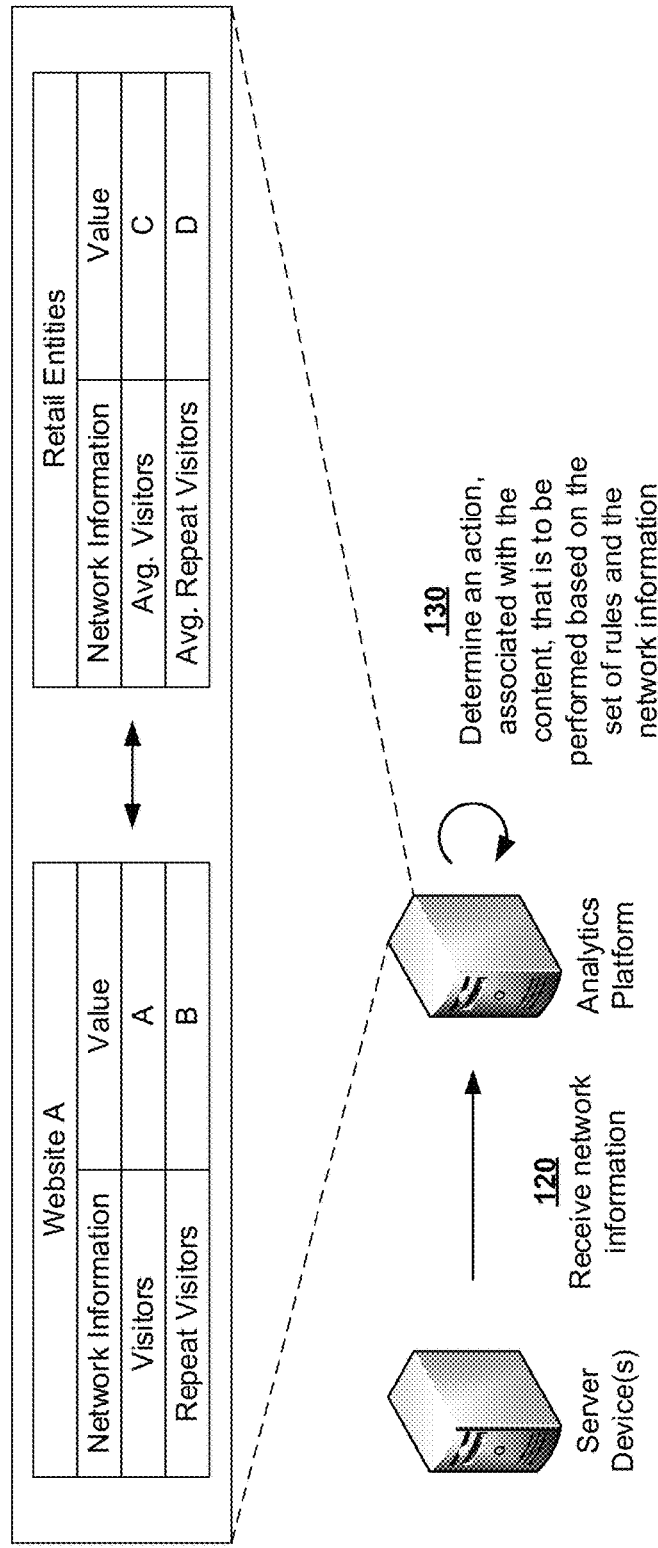
Figure 1C:
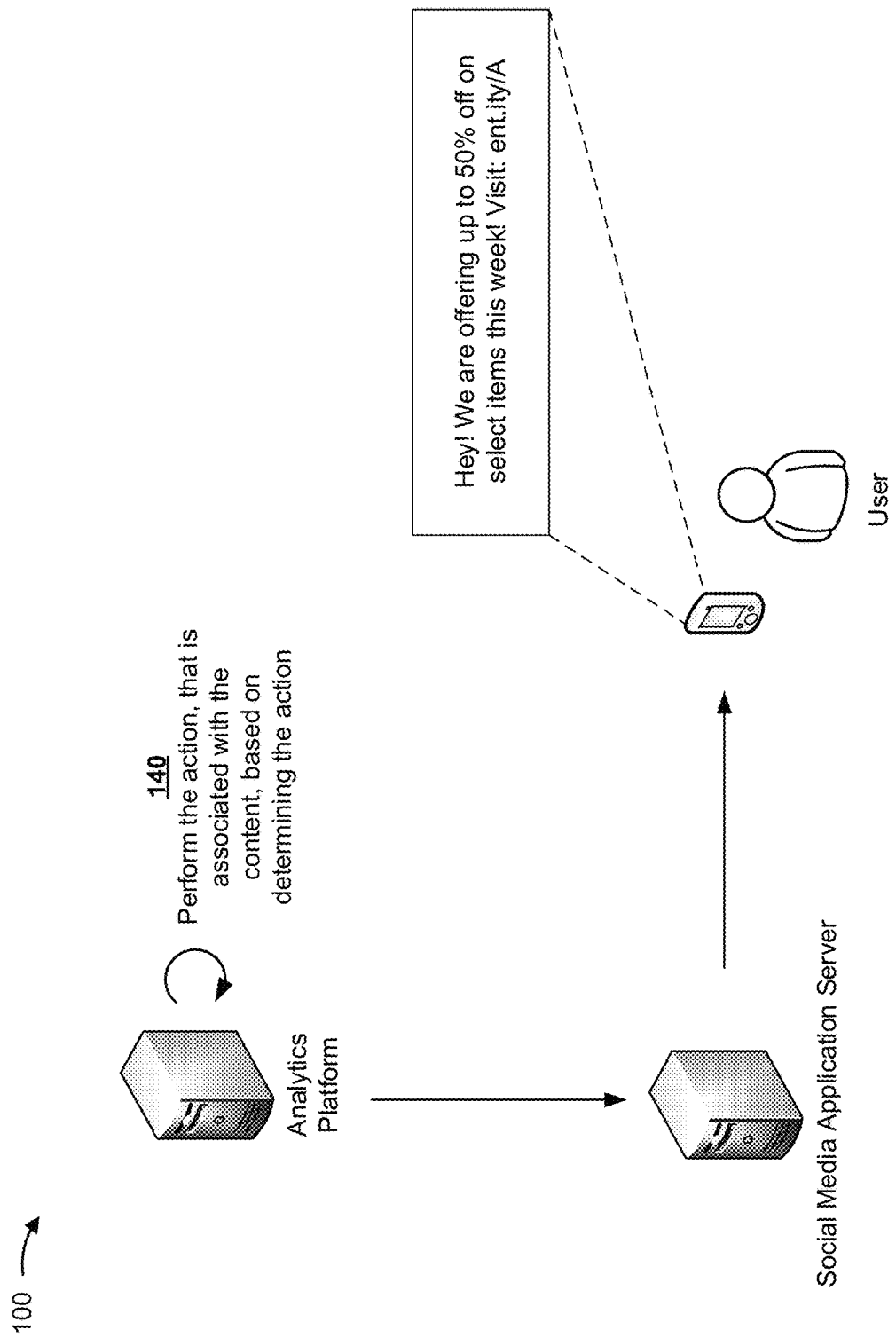

FIGS. 1A-1C are diagrams of an overview of an example implementation 100 described herein. As shown in FIGS. 1A-1C, an analytics platform can provide content management as a service (CMaaS) that permits entities to configure particular content that is to be provided to user devices, social media application servers, and/or the like, and configure rules for providing the content.

As shown in FIG. 1A, and by reference number 110, the analytics platform can receive information associated with content, and information associated with a rule that identifies a set of conditions for providing the content. For example, as shown, the analytics platform can receive, from a client device (e.g., which might have received an input from an operator), information associated with a resource identifier that identifies a memory location at which content (e.g., an image, text, a video, and/or the like) can be retrieved, and information that identifies a set of conditions for providing the content.

For example, the set of conditions indicates that if a number of unique visits to a particular website of an entity (e.g., entity A) is less than an average number of visits for a set of websites associated with a set of entities (e.g., a set of retail entities), then the analytics platform is to cause a social media post to be generated. As an example, assume that the operator is associated with entity A, and that the operator wishes to configure content to be posted to a social media account of entity A. As further shown, the analytics platform can provide information that identifies a number of times the rule might have been triggered in the past week (e.g., using historical data).

As shown in FIG. 1B, and by reference number 120, the analytics platform can receive network information from a set of server devices. For example, the network information can include network traffic metrics associated with a particular website (e.g., a number of visitors to a website of entity A, a number of repeat visitors to the website of entity A, and/or the like). Additionally, the network information can include network traffic metrics associated with a set of other websites, such as websites associated with a set of retail entities (e.g., a number of visitors to the other set of websites, a number of repeat visitors to the other set of websites, and/or the like).

As further shown in FIG. 1B, and by reference number 130, the analytics platform can determine an action, associated with the content, that is to be performed based on the set of rules and the network information. For example, the analytics platform can determine that a number of visitors (e.g., value A) associated with website A is less than an average number of visitors (e.g., value C) associated with the other set of websites. In this case, the analytics platform can determine that the action (e.g., create a social media post) is to be performed based on the set of conditions being satisfied.

As shown in FIG. 1C, and by reference number 140, the analytics platform can perform the action, that is associated with the content, based on determining the action. For example, the analytics platform can cause content to be uploaded to a social media application server to permit the social media application server to update a social media account associated with entity A. As described in more detail in association with FIG. 4, the analytics platform can implement machine learning techniques to identify particular content that is to be uploaded to the social media application server.

As shown, the social media application server can provide, to a user device, software, a platform, and/or the like, information associated with a social media post. For example, the user device can provide, for display via a user interface, information associated with the social media post (e.g., "Hey! We are offering up to 50% off on select items this week! Visit: entity/A") to permit a user of the user device to view the social media post, interact with the social media post, and/or the like.

In this way, some implementations described herein provide an analytics platform that can automatically perform content delivery actions based on real-time network information, and identify particular content that is to be delivered. In this way, some implementations described herein reduce an amount of manual configuration associated with content delivery, reduce subjectivity associated with content delivery, reduce a number of situations where inapplicable and/or non-engaging content is delivered, and/or the like, thereby conserving network resources and/or conserving computing resources associated with configuration devices and/or user devices. Additionally, in this way, some implementations described herein improve user experience, improve brand recognition and/or status, increase engagement, solicit desired behavior, and/or the like.

As indicated above, FIGS. 1A-1C are provided merely as an example. Other examples are possible and can differ from what was described with regard to FIGS. 1A-1C. The number and arrangement of devices shown in FIGS. 1A-1C are provided as an example. In practice, there can be additional devices, fewer devices, different devices, or differently arranged devices than those shown in FIGS. 1A-1C. Furthermore, two or more devices shown in FIGS. 1A-1C can be implemented within a single device, or a single device shown in FIGS. 1A-1C can be implemented as multiple, distributed devices. Additionally, or alternatively, a set of devices (e.g., one or more devices) of FIGS. 1A-1C can perform one or more functions described as being performed by another set of devices of FIGS. 1A-1C.

Figure 2:
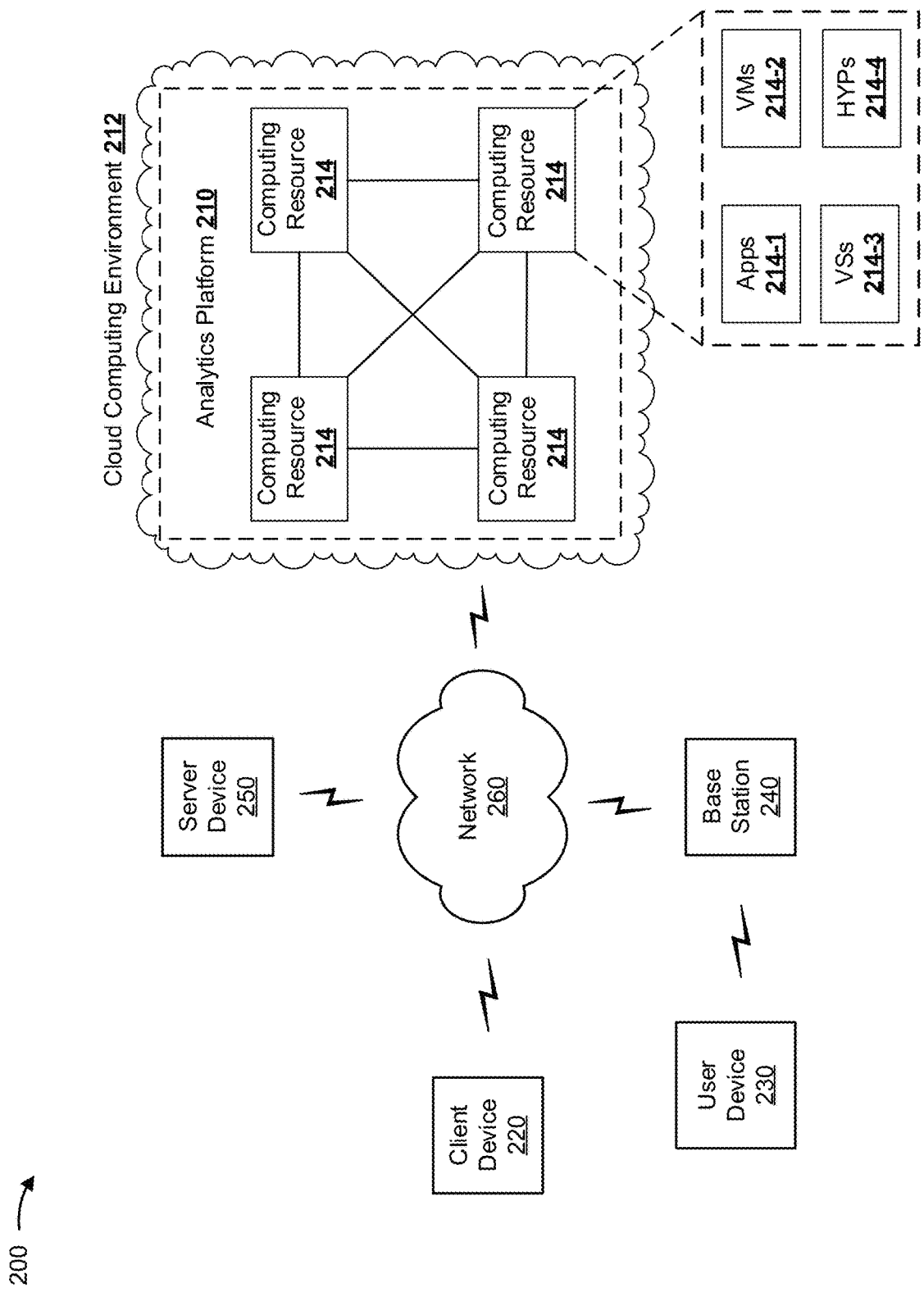
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include an analytics platform 210, a client device 220, a user device 230, a base station 240, a server device 250, and a network 260. Devices of environment 200 can interconnect via wired connections, wireless connections, optical connections, or a combination of connections.

Analytics platform 210 includes one or more devices capable of providing content management as a service (e.g., CMaaS). In some implementations, analytics platform 210 can be designed to be modular such that certain software components can be swapped in or out depending on a particular need. As such, analytics platform 210 can be easily and/or quickly reconfigured for different uses.

In some implementations, as shown, analytics platform 210 can be hosted in cloud computing environment 212. Notably, while implementations described herein describe analytics platform 210 as being hosted in cloud computing environment 212, in some implementations, analytics platform 210 might not be cloud-based (i.e., can be implemented outside of a cloud computing environment) or can be partially cloud-based.

Cloud computing environment 212 includes an environment that hosts analytics platform 210. Cloud computing environment 212 can provide computation, software, data access, storage, etc. services that do not require end-user (e.g., client device 220) knowledge of a physical location and configuration of system(s) and/or device(s) that hosts analytics platform 210. As shown, cloud computing environment 212 can include a group of computing resources 214 (referred to collectively as "computing resources 214" and individually as "computing resource 214").

Computing resource 214 includes one or more personal computers, workstation computers, server devices, or other types of computation and/or communication devices. In some implementations, computing resource 214 can host analytics platform 210. The cloud resources can include compute instances executing in computing resource 214, storage devices provided in computing resource 214, data transfer devices provided by computing resource 214, etc. In some implementations, computing resource 214 can communicate with other computing resources 214 via wired connections, wireless connections, or a combination of wired and wireless connections.

As further shown in FIG. 2, computing resource 214 includes a group of cloud resources, such as one or more applications ("APPs") 214-1, one or more virtual machines ("VMs") 214-2, virtualized storage ("VSs") 214-3, one or more hypervisors ("HYPs") 214-4, or the like.

Application 214-1 includes one or more software applications that can be provided to or accessed by client device 220. Application 214-1 can eliminate a need to install and execute the software applications on client device 220. For example, application 214-1 can include software associated with analytics platform 210 and/or any other software capable of being provided via cloud computing environment 212. In some implementations, one application 214-1 can send/receive information to/from one or more other applications 214-1, via virtual machine 214-2.

Virtual machine 214-2 includes a software implementation of a machine (e.g., a computer) that executes programs like a physical machine. Virtual machine 214-2 can be either a system virtual machine or a process virtual machine, depending upon use and degree of correspondence to any real machine by virtual machine 214-2. A system virtual machine can provide a complete system platform that supports execution of a complete operating system ("OS"). A process virtual machine can execute a single program, and can support a single process. In some implementations, virtual machine 214-2 can execute on behalf of a user (e.g., client device 220), and can manage infrastructure of cloud computing environment 212, such as data management, synchronization, or long-duration data transfers.

Virtualized storage 214-3 includes one or more storage systems and/or one or more devices that use virtualization techniques within the storage systems or devices of computing resource 214. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 214-4 can provide hardware virtualization techniques that allow multiple operating systems (e.g., "guest operating systems") to execute concurrently on a host computer, such as computing resource 214. Hypervisor 214-4 can present a virtual operating platform to the guest operating systems, and can manage the execution of the guest operating systems. Multiple instances of a variety of operating systems can share virtualized hardware resources.

Client device 220 includes one or more devices capable of receiving, generating, storing, processing, and/or providing information associated with a content management service. For example, client device 220 can include a device, such as a mobile phone (e.g., a smart phone, a radiotelephone, etc.), a laptop computer, a tablet computer, a handheld computer, a desktop computer, or a similar type of device.

User device 230 includes one or more devices capable of receiving, generating, storing, processing, and/or providing information associated with content. For example, user device 230 can include a device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a set-top box, or a similar type of device.

Base station 240 includes one or more devices capable of transferring network traffic, such as audio, video, text, and/or other network traffic, destined for and/or received from user device 230. In some implementations, base station 240 can include an eNodeB (eNB) associated with the long-term evolution (LTE) network that receives network traffic from and/or sends network traffic to network 260 via a serving gateway (SGW) and/or a packet data network gateway (PGW). Additionally, or alternatively, one or more base stations 240 can be associated with a radio access network (RAN) that is not associated with the LTE network. Base station 240 can send network traffic to and/or receive network traffic from user device 230 via an air interface. In some implementations, base station 240 can include a small cell base station, such as a base station of a microcell, a picocell, and/or a femtocell.

Server device 250 includes one or more devices capable of receiving, generating, storing, processing, and/or providing network traffic. For example, server device 250 can include a server device (e.g., a host server, a web server, an application server, etc.), a data center device, or a similar device.

Network 260 includes one or more wired and/or wireless networks. For example, network 260 can include a cellular network (e.g., a fifth generation (5G) network, an LTE network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
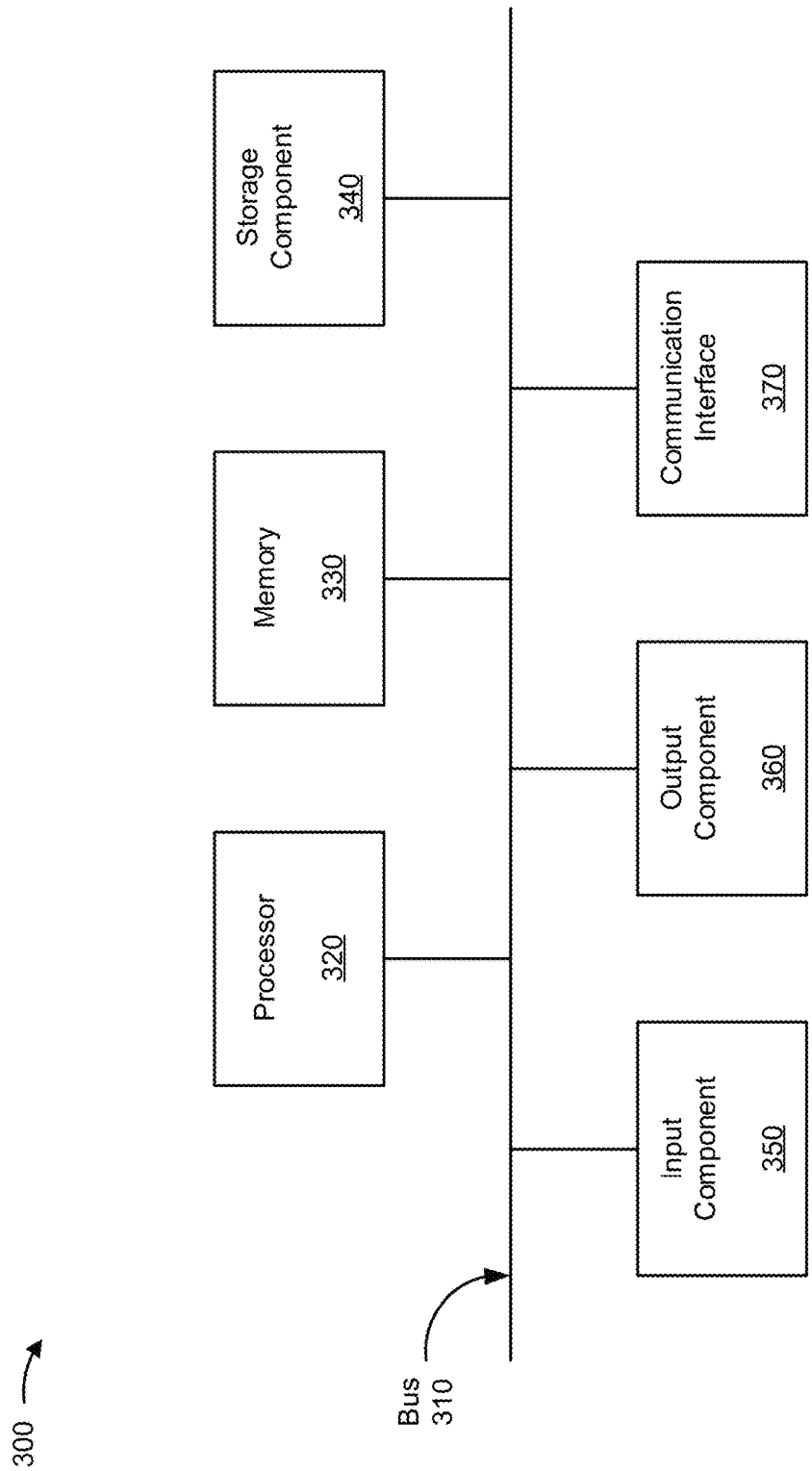
FIG. 3 is a diagram of example components of one or more devices of FIG. 2.

FIG. 3 is a diagram of example components of a device 300. Device 300 can correspond to analytics platform 210, computing resource 214, client device 220, user device 230, base station 240, and/or server device 250. In some implementations, analytics platform 210, computing resource 214, client device 220, user device 230, base station 240, and/or server device 250 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
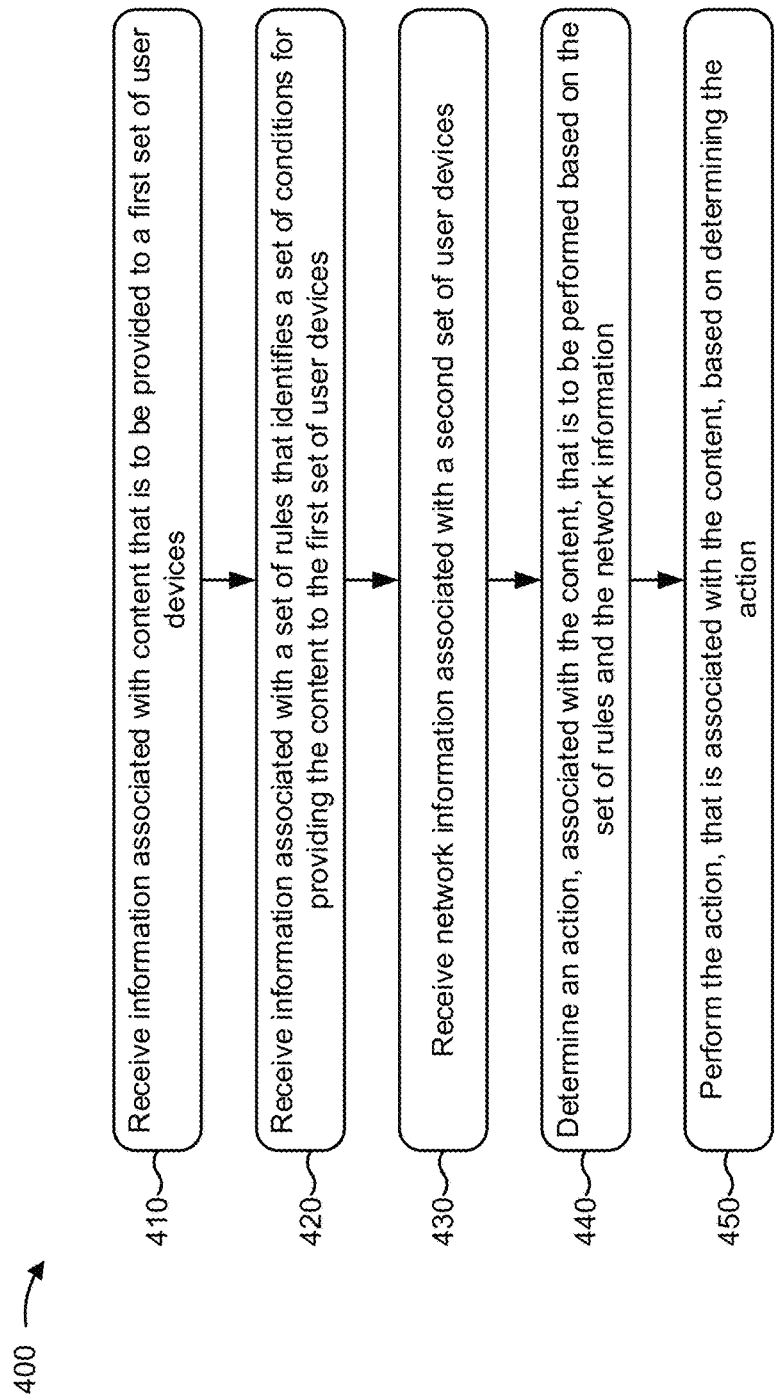
FIG. 4 is a flow chart of an example process for enabling automated action performance using network data in association with machine learning and big data techniques.

FIG. 4 is a flow chart of an example process 400 for enabling automated action performance using real-time network data in association with machine learning and big data techniques. In some implementations, one or more process blocks of FIG. 4 can be performed by analytics platform 210. In some implementations, one or more process blocks of FIG. 4 can be performed by another device or a group of devices separate from or including analytics platform 210, such as client device 220, user device 230, base station 240, and/or server device 250.

As shown in FIG. 4, process 400 can include receiving information associated with content that is to be provided to a first set of user devices (block 410). For example, analytics platform 210 can receive, from client device 220, information associated with content that is to be provided to user devices 230 in association with a social media campaign, an advertising campaign, a marketing campaign, a promotional campaign, and/or the like.

In some implementations, analytics platform 210 can receive information associated with content based on an input received by client device 220 (e.g., by an operator), based on a time frame, based on an event, based on server device 250 storing the content, and/or the like.

In some implementations, the information associated with content can include particular content (e.g., video content, audio content, text content, and/or the like). Additionally, or alternatively, the information associated with content can include a resource identifier that identifies a memory location at which content can be stored and/or from which the content can be retrieved. Additionally, or alternatively, the information associated with content can include a set of parameters that can be used by analytics platform 210 to identify content. For example, the set of parameters can identify metadata, a type of content, a theme associated with content, and/or the like.

In some implementations, the information associated with content can include a promotion, an advertisement, a message, and/or the like. For example, the information associated with content can be used to generate social media posts, emails, SMS messages, and/or the like. In this way, analytics platform 210 can perform actions using the information associated with content based on a set of rules, as described elsewhere herein.

As further shown in FIG. 4, process 400 can include receiving information associated with a set of rules that identifies a set of conditions for providing the content to the first set of user devices (block 420). For example, analytics platform 210 can receive, from client device 220, information that identifies a set of rules and conditions for providing the content.

In some implementations, analytics platform 210 can receive the information associated with the set of rules based on an input from client device 220, based on a time frame, based on an event, and/or the like. In some implementations, analytics platform 210 provides CMaaS whereby an entity can configure rules associated with a campaign to permit analytics platform 210 to automatically cause actions to be performed in association with the campaign (e.g., generate social media posts, send SMS messages, send email messages, and/or the like).

In some implementations, a rule can include a set of conditions that can result in an action. For example, a condition can include a network metric satisfying a threshold, such as a number of visitors to a website, a number of unique visitors to a website, a number of repeat visitors to a website, a number of page views, a number of likes, a number of favorites, a number of shares, a number of mentions, and/or the like. Additionally, or alternatively, a condition might be based on the occurrence of an event (e.g., a weather event, a stock price satisfying a threshold, a promotion, a live event, an advertisement, and/or the like).

In some implementations, a rule can correspond to a change in a state of a network. For example, a state of a network can correspond to network traffic metrics associated with a particular website, a set of websites, a set of websites associated with an entity, a set of websites associated with a set of entities, a set of metrics associated with an account, a set of metrics associated with a set of accounts, and/or the like. In other words, a rule might identify that if a state of a network changes, then a rule might be triggered.

In some implementations, a first entity can configure rules that are based on network metrics of another set of entities (e.g., competitors, peers, similar entities, and/or the like). For example, a rule might indicate that if a web site, a social media post, and/or the like, of a second entity is associated with a network metric (e.g., a number of visits, a number of likes, and/or the like), then analytics platform 210 can cause an action to be performed in association with the first entity (e.g., cause a social media post to be generated for the first entity, launch a campaign, and/or the like). In this way, a first entity can utilize analytics platform 210 to cause actions to be performed based on conditions associated with a second entity, a set of other entities, and/or the like.

In some implementations, an action can correspond to generating a social media post, sending an SMS, sending an email, sending a notification, updating a CRM platform, updating a CRM database, updating an internal database of an entity, procuring a service and/or product, updating a webpage, offering a product and/or service, and/or the like.

In some implementations, analytics platform 210 can receive, from client device 220, information associated with a rule. For example, an operator can interact with client device 220 to create a rule. In some implementations, analytics platform 210 can, using historical data, provide information that identifies a number of times a rule might have been triggered for a particular time frame (e.g., the past week, the past month, and/or the like). In this way, an operator can identify a frequency at which the rule might be triggered in the future.

In some implementations, analytics platform 210 can provide, to client device 220, information that identifies rules, and can receive information that identifies a selection of a particular rule. For example, analytics platform 210 can provide recommendations that identify rules that might be implemented. In some implementations, analytics platform 210 can identify rules that include actions that have resulted in particular outcomes for the entity, for other entities, for similar entities, and/or the like. As an example, analytics platform 210 can identify rules that, when triggered, result in particular user behavior (e.g., an increase in network traffic, an increase in downloads, an increase in sales, an increase in likes, an increase in shares, and/or the like). As described elsewhere herein, analytics platform 210 can implement machine learning techniques to generate recommendations. For example, analytics platform 210 can train a model using training data, and use the model to determine a set of rules to be implemented.

In some implementations, analytics platform 210 can store and/or access information associated with a graph data structure that includes nodes and edges. For example, the nodes can represent websites, webpages, users, visitors, user devices, entities, software, platforms, and/or the like. Additionally, the edges can represent relationships between nodes.

In some implementations, analytics platform 210 can receive information that identifies rules associated with state changes of a network (e.g., state changes such as a change in visits, visitors, and/or other complex composite metrics). Additionally, analytics platform 210 can identify rules that performed favorably for nodes in the network (e.g., websites, devices, platforms, users, and/or the like) that are identified as being responsible for driving the state changes. Additionally, analytics platform 210 can recommend rules to an existing node and/or a new node based on a similarity between a node and a historic scenario and/or based on other metrics. Analytics platform 210 can continuously monitor the recommended rules for performance (e.g., successfulness, viability, etc.) and continuously refine recommended rules and/or actions.

In this way, analytics platform 210 can receive information associated with a set of rules, and can compare network information and the set of rules to determine whether to perform actions, as described elsewhere herein.

As further shown in FIG. 4, process 400 can include receiving network information associated with a second set of user devices (block 430). For example, analytics platform 210 can receive network information associated with a set of user devices 230 that are accessing or have accessed network 260, that are accessing or have accessed a radio access network (RAN) associated with base station 240, and/or the like.

In some implementations, analytics platform 210 can receive millions, billions, trillions, etc. of data points associated with network information. As such, analytics platform 210 can implement big data processing techniques to efficiently process such a large quantity of data. By analyzing such a large of quantity of data, analytics platform 210 can more accurately identify actions and/or content that might result in a particular outcome (e.g., based on previous outcomes).

In some implementations, analytics platform 210 can receive network information based on user device(s) 230 accessing network 260 and/or a RAN associated with base station 240, based on a time frame, and/or the like. Additionally, or alternatively, analytics platform 210 can receive network information from a set of server devices 250. For example, analytics platform 210 can use a set of application programming interfaces (APIs) to receive network information from a set of server devices 250. Additionally, or alternatively, analytics platform 210 can receive a set of files, a data set, and/or the like, that includes the network information.

In some implementations, the network information can include network traffic metrics and/or statistics associated with a set of server devices 250 (e.g., web servers, application servers, database servers, and/or the like), such as a number of downloads, a number of page views, a number of visitors, a number of repeat visitors, and/or the like.

In some implementations, the network information can include demographic information associated with users of user devices 230, browsing history data associated with users of user devices 230, geolocation information of user devices 230, download history associated with user devices 230, activity history of user devices 230, and/or the like. In some implementations, analytics platform 210 can receive such network information from a network device, server device 250, and/or the like. For example, a network operator might store and/or access such information, and permit analytics platform 210 to access the network information to identify content.

In some implementations, the network information can include information associated with a stock value, a weather condition, an event, a day of the week, a week of the month, a season, and/or the like. In other words, the network information can include any type of information that can be used by analytics platform 210 to determine actions to be performed.

It should be understood that analytics platform 210 might use some or all of the network information described above when determining that the action is to be performed.

In this way, analytics platform 210 can receive real-time network information, and determine actions to be performed based on the network information and the set of rules, as described below.

As further shown in FIG. 4, process 400 can include determining an action, associated with the content, that is to be performed based on the set of rules and the network information (block 440). For example, analytics platform 210 can compare network information and a rule to determine whether a set of conditions, associated with the rule, is satisfied. In the event that the set of conditions is satisfied, then analytics platform 210 can determine an action, that corresponds to the rule, and determine that the action is to be performed. Alternatively, analytics platform 210 can determine that the set of conditions is not satisfied, and can prevent an action from being performed based on the set of conditions not being satisfied. In this way, analytics platform 210 can determine that an action is to be performed, and can perform the action, as described elsewhere herein.

In practice, analytics platform 210 can receive information associated with hundreds, thousands, millions, etc. of rules. Additionally, analytics platform 210 can receive millions, billions, or trillions of items of network information. As such, analytics platform 210 can implement a big data processing technique to efficiently process the items of network information. Additionally, in practice, analytics platform 210 can receive hundreds, thousands, or millions of items of content, and/or hundreds, thousands, or millions of actions that can be performed.

In some implementations, analytics platform 210 can identify content to be used in association with the action using a model. In some implementations, analytics platform 210 can use machine learning techniques to analyze data (e.g., training data, such as historical data, etc.) and create models. The machine learning techniques can include, for example, supervised and/or unsupervised techniques, such as artificial networks, Bayesian statistics, learning automata, Hidden Markov Modeling, linear classifiers, quadratic classifiers, decision trees, association rule learning, and/or the like. In some implementations, analytics platform 210 can use another kind of computer-implemented technique, such as artificial intelligence, machine perception, or computer vision, to analyze data and generate models.

In some implementations, analytics platform 210 can use a model to determine content to be used by inputting a set of parameters into the model, and determining an output of the model. For example, analytics platform 210 can input a set of parameters, such as network information, demographic information, and/or the like, and determine an output of the model. In some implementations, analytics platform 210 can use the output of the model to identify and/or select content to be provided in association with a social media post.

In some implementations, analytics platform 210 can use a computer vision technique to identify content to be used in association with the action. For example, analytics platform 210 can compare, using a computer vision technique, content that is available to be provided in association with the action (e.g., potential content) and content that has been downloaded, provided for display, liked, favorited, shared, and/or the like (e.g., viewed content), by and/or in association with a set of user devices 230 associated with a targeted demographic. In some implementations, a targeted demographic can refer to a demographic to which an entity wishes to provide content, advertise content, and/or the like.

In some implementations, analytics platform 210 can identify network information associated with a set of user devices 230 that is associated with a particular demographic, and can identify content that was provided for display by the set of user devices 230, downloaded by the set of user devices 230, shared by the set of user devices 230, and/or the like. In some implementations, analytics platform 210 can identify a set of user devices 230 that is associated with a particular demographic, a geolocation, a subscription status (e.g., to a social media account, and/or the like), a browsing history, and/or the like. Additionally, analytics platform 210 can identify content that was downloaded, provided for display, favorited, liked, shared, and/or the like, by and/or in association with the set of user devices 230. In this way, analytics platform 210 can identify content that has been viewed by the targeted demographic, is regarded favorably by the targeted demographic, and/or the like.

In some implementations, analytics platform 210 can compare the potential content and the viewed content and determine a set of similarity scores between the potential content and the viewed content. Additionally, analytics platform 210 can identify particular content, of the potential content, to be used in association with the action based on the similarity scores (e.g., by selecting content that includes the greatest similarity score, by selecting content that includes the greatest average similarity score, by selecting content that includes a similarity score that satisfies a threshold, and/or the like).

In other words, analytics platform 210 can identify a set of users that drives a state change in a network. Additionally, analytics platform 210 can identify a threshold number (e.g., the top five, the top ten, etc.) of items of content that were viewed by the users, downloaded by the users, interacted with by the users, and/or the like (e.g., known content). Additionally, analytics platform 210 can compare the known content and content associated with a repository (e.g., potential content), and determine similarity scores between the known content and the potential content. Additionally, analytics platform 210 can identify a particular item of content based on a similarity score (e.g., the greatest similarity score), and select the particular item of content to be used in association with the action.

In some implementations, analytics platform 210 can identify, using a technique, a theme, a subject, a concept, and/or the like, associated with the known content, and determine relevancy scores between the potential content and the theme, the subject, the concept, and/or the like. Additionally, analytics platform 210 can identify a set of themes and a set of relevancy scores. Additionally, analytics platform 210 can select a particular item of content based on the relevancy scores (e.g., by selecting the item of content that includes the greatest relevancy score, the greatest average relevancy scores, and/or the like).

In some implementations, analytics platform 210 can remove a particular item of content from a content repository based on using the item of content. Alternatively, analytics platform 210 can prevent the particular item of content from being used for a threshold amount of time, and/or the like. In this way, particular content can be prevented from being used again, from being overused, and/or the like.

In some implementations, analytics platform 210 can analyze the viewed content, visited websites, geolocations of user devices 230, and/or the like, to identify a theme, a concept, a subject, a geolocation, a brand, an entity, and/or the like, associated with the viewed content, the visited websites, the geolocations of user devices 230, and/or the like. For example, analytics platform 210 can use an image processing technique and/or a computer vision technique to analyze the viewed content. Additionally, analytics platform 210 can select particular content, of the potential content, to be used based on the particular content including and/or being associated with a theme, a concept, a subject, a geolocation, a brand, an entity, and/or the like, of the viewed content. In this way, analytics platform 210 can identify and use content that is more likely to interest users of user devices 230 to which the action is applicable.

As further shown in FIG. 4, process 400 can include performing the action, that is associated with the content, based on determining the action (block 450). For example, analytics platform 210 can identify an action based on a rule, and can cause the action to be performed.

In some implementations, analytics platform 210 can perform the action by causing content to be uploaded to server device 250 (e.g., a social media application server, a web server, a database server, and/or the like), causing an SMS message to be provided, causing an email message to be provided, causing a product and/or service to be offered for sale, causing a product and/or service to be procured, causing a webpage to be updated, causing a campaign (e.g., a sale, a promotion, and/or the like) to be implemented, and/or the like.

In some implementations, analytics platform 210 can perform the action by generating a social media post. For example, analytics platform 210 can generate a set of social media posts that correspond to a set of social media applications. In some implementations, analytics platform 210 can identify content that is to be used in association with the social media post. For example, analytics platform 210 can identify content that was received in association with block 410, and use the content when generating the social media post.

In some implementations, analytics platform 210 can update a model based on causing the action to be performed. For example, analytics platform 210 can receive additional network information after causing the action to be performed, such as information that identifies a number of downloads of the content, a number of likes, a number of shares, a number of sales associated with an underlying product and/or service associated with the content, a number of followers, and/or the like. In this way, analytics platform 210 can train more accurate models by utilizing feedback information associated with real-time network data that identifies whether a previous action was successful, not successful, marginally successful, and/or the like. For example, analytics platform 210 can monitor a change in a state of a network using real-time network data. In this way, analytics platform 210 can update models automatically by analyzing additional network data.

In some implementations, analytics platform 210 can provide, to client device 220, information associated with a set of recommendations for rules and/or actions that can be implemented. For example, analytics platform 210 can identify actions that resulted in particular outcomes, that are likely to result in particular outcomes, and/or the like, and can provide recommendations regarding the actions.

In this way, analytics platform 210 provides CMaaS that permits automated content delivery based on rules and real-time network information associated with millions, billions, trillions, etc. of users, and hundreds, thousands, and/or millions or rules.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Figure 5:
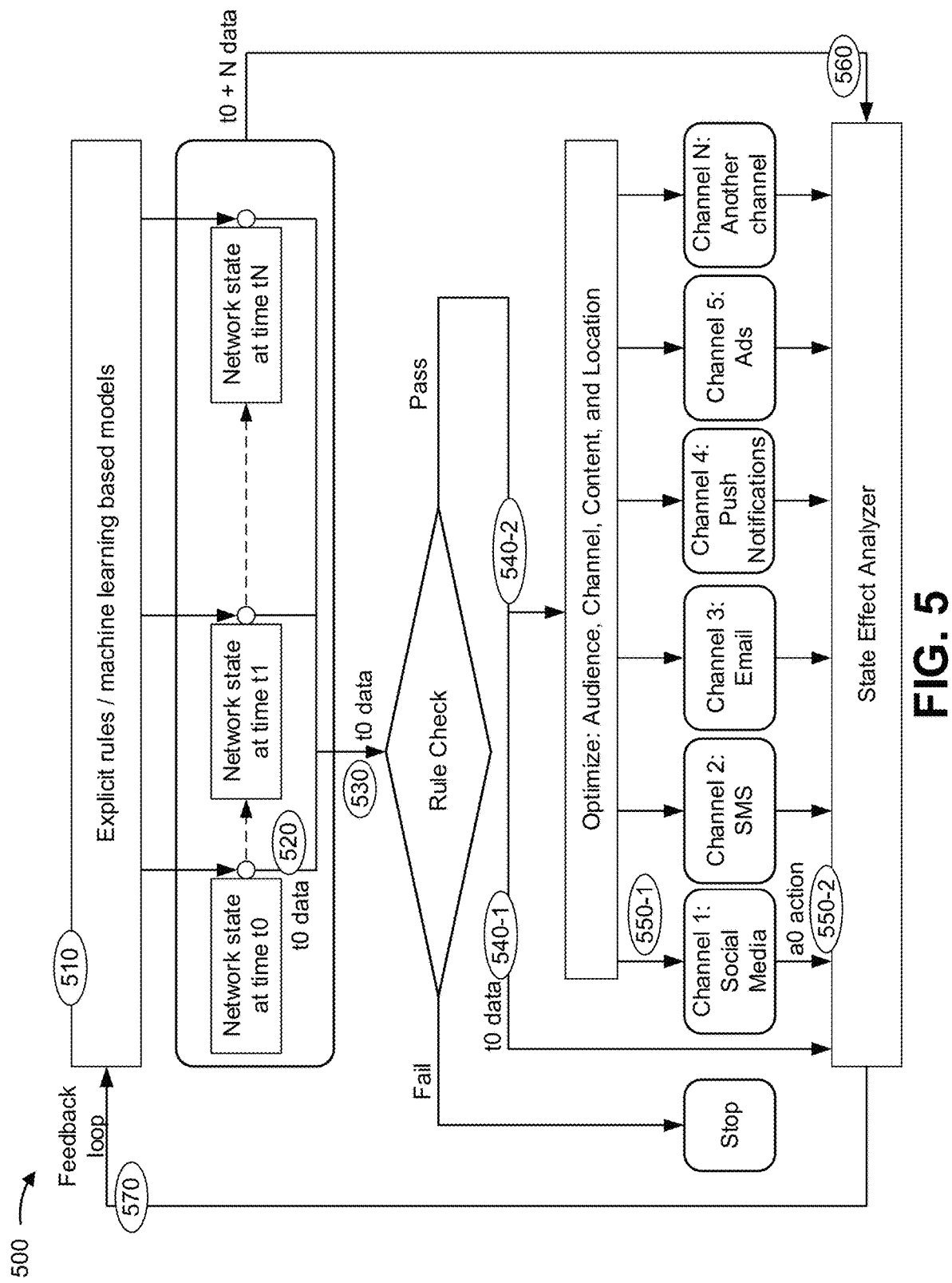
FIG. 5 is a diagram of an example implementation relating to the example process shown in FIG. 4.

FIG. 5 is a diagram of an example implementation 500 relating to example process 400 shown in FIG. 4. FIG. 5 shows an example of enabling automated action performance using network data in association with machine learning and big data techniques.

As shown in FIG. 5, and by reference number 510, analytics platform 210 can receive information associated with explicit rules and/or machine learning based models. For example, analytics platform 210 can receive information associated with thousands, millions, etc. of rules, in a similar manner as described above in connection with block 420 (FIG. 4). Additionally, or alternatively, analytics platform 210 can receive information associated with a set of models. In some implementations, analytics platform 210 can train the set of models. Alternatively, analytics platform 210 can receive trained models from another device.

As shown by reference number 520, analytics platform 210 can receive network information that corresponds to a network state at a first time (e.g., t0). For example, the network information can correspond to network information described above in connection with block 430 (FIG. 4). As examples, the network information can include information associated with a set of user devices 230, such as browsing history that is indicative of websites visited, applications used, categories of content accessed, content (e.g., text, images, audio, video, etc.) consumed, recentness and/or frequency of visitation, geographic location of user devices 230, and/or the like.

As shown by reference number 530, analytics platform 210 can, using the network information that corresponds to the network state at the first time, determine an action that is to be performed based on the set of rules and the network information. For example, analytics platform 210 can perform a rule check whereby analytics platform 210 determines whether a set of conditions, associated with a rule, is satisfied. Additionally, or alternatively, analytics platform 210 can input the network information into a model, and determine an action based on an output of the model.

As shown, and in situations where a set of conditions, associated with a rule, is not satisfied (e.g., shown as "fail"), then analytics platform 210 can refrain from performing an action because the set of conditions was not satisfied. Alternatively, as shown by reference number 540-1 and in situations where a set of conditions, associated with a rule, is satisfied (e.g., shown as "pass"), then analytics platform 210 can provide the network information to a state effect analyzer module of analytics platform 210. Additionally, or alternatively, and as shown by reference number 540-2, analytics platform 210 can send the network information to a message optimizer module of analytics platform 210.

As shown by reference number 550-2, the message optimizer module of analytics platform 210 can select a subscriber audience, identify appropriate content, identify a particular channel (e.g., a social media service, a SMS service, an email service, a push notification service, an advertising service, and/or the like) to be used to send the content, and/or the like.

In some implementations, the message optimizer module of analytics platform 210 can determine the above parameters based on a rule and/or a model using machine learning techniques, as described above in connection with block 440 (FIG. 4). For example, analytics platform 210 can perform a set of actions that corresponds to utilizing one or more of the channels shown in FIG. 5, such as by updating a social media account, sending SMS messages to user devices 230, sending emails to a set of recipient addresses, providing push notifications to user devices 230, causing an advertising campaign to be updated, and/or utilizing another channel.

As shown by reference number 550-2, the message optimizer module of analytics platform 210 can provide, to the state effect analyzer module, information associated with an action that was performed. For example, the information associated with the action that was performed can include information identifying the action, content associated with the action, a message associated with the action, a time at which the action was performed, a set of user devices 230 associated with the action (e.g., audience information), and/or the like.

As shown by reference number 560, the state effect analyzer module of analytics platform 210 can receive additional network information in association with a set of time frames (e.g., t0 through tN). As shown by reference number 570, the state effect analyzer module can update a model using information associated with network information that caused the action to be performed (e.g., a triggering event associated with reference number 540-2), action information associated with reference number 550-2, and additional network information associated with reference number 560. In this way, analytics platform 210 can update a rule and/or a model based on the information received in association with reference number 570. Thereby, analytics platform 210 can utilize a feedback loop to increase rule and/or model accuracy, such that actions can result in more predictable outcomes than as compared to situations where feedback information it not utilized.

As indicated above, FIG. 5 is provided merely as an example. Other examples are possible and can differ from what was described with regard to FIG. 5.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface can include a graphical user interface, a non-graphical user interface, a text-based user interface, or the like. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising: one or more memories; and one or more processors, communicatively coupled to the one or more memories, to: receive information associated with content that is to be provided to a first set of user devices; receive information associated with a set of rules that identifies a set of conditions for providing the content to the first set of user devices; receive network information associated with a second set of user devices that are different than the first set of user devices; determine that at least one condition, of the set of conditions identified in the set of rules, is satisfied based on the network information associated with the second set of user devices; determine, using a machine learning model, an action, associated with the content, to be performed utilizing a particular channel based on determining that the at least one condition is satisfied based on the network information, the one or more processors, when determining the action associated with the content to be performed, are to: input a set of parameters into the machine learning model, the set of parameters including one or more of: the network information, demographic information, or geographic information, and determine an output of the machine learning model, the output to identify the content to optimize a campaign by utilizing the particular channel to be perform the action; perform the action utilizing the particular channel to provide the content based on determining the action to be performed; and train the machine learning model by utilizing feedback information associated with network data based on the action.

2. The device of claim 1, where the one or more processors are further to:
determine, based on the network information, that a network metric satisfies a threshold; and
perform the action, associated with the content, based on the network metric satisfying the threshold.

3. The device of claim 1, where the one or more processors are further to:
determine, based on the network information, the demographic information associated with the second set of user devices; and
determine the action to be performed based on the demographic information associated with the second set of user devices.

4. The device of claim 1, where the one or more processors are further to:
identify, based on the network information, other content that was received by the second set of user devices;
determine a similarity score associated with the content and the other content; and
perform the action, associated with the content, based on the similarity score associated with the content and the other content.

5. The device of claim 1, where the one or more processors are further to:
receive information associated with a result of the action; and
update the set of rules based on the information associated with the result of the action.

6. The device of claim 1, where the one or more processors are further to:
determine geolocation information associated with the first set of user devices; and
perform the action, associated with the content, based on the geolocation information associated with the first set of user devices.

7. The device of claim 1, where the one or more processors are further to:
determine, based on the network information, browsing histories of the second set of user devices in association with a first entity,
the first entity being different than a second entity associated with the content; and
perform the action, associated with the content, based on determining the browsing histories of the second set of user devices.

8. A non-transitory computer-readable medium storing instructions, the instructions comprising:
one or more instructions that, when executed by one or more processors, cause the one or more processors to:
receive information associated with content that is to be provided to a first set of user devices;
receive information associated with a set of rules that identifies a set of conditions for providing the content to the first set of user devices;
receive network information associated with a second set of user devices that are different than the first set of user devices;
determine that at least one condition, of the set of conditions identified in the set of rules, is satisfied based on the network information associated with the second set of user devices;
determine, using a machine learning model, an action, associated with the content, to be performed utilizing a particular channel based on determining that the at least one condition is satisfied based on the network information,
where the one or more instructions, when executed by the one or more processors to determine the action associated with the content to be performed, cause the one or more processors to:
input a set of parameters into the machine learning model,
the set of parameters including one or more of:
the network information,
demographic information, or
geographic information, and
determine an output of the machine learning model,
the output to identify the content to optimize a campaign by utilizing the particular channel to perform the action;
perform the action utilizing the particular channel to provide the content based on determining the action to be performed; and train the machine learning model by utilizing feedback information associated with network data based on the action.

9. The non-transitory computer-readable medium of claim 8, where the one or more instructions, when executed by the one or more processors, further cause the one or more processors to:
determine, based on the network information, that a number of visits to a website satisfies a threshold; and
perform the action, associated with the content, based on the number of visits to the website satisfying the threshold.

10. The non-transitory computer-readable medium of claim 8, where the one or more instructions, when executed by the one or more processors, further cause the one or more processors to:
determine, based on the network information, the demographic information associated with the second set of user devices; and
determine the action to be performed based on the demographic information associated with the second set of user devices.

11. The non-transitory computer-readable medium of claim 8, where the one or more instructions, when executed by the one or more processors, further cause the one or more processors to:
identify, based on the network information, other content that was received by the second set of user devices;
determine a similarity score associated with the content and the other content; and
perform the action, associated with the content, based on the similarity score.

12. The non-transitory computer-readable medium of claim 8, where the one or more instructions, when executed by the one or more processors, further cause the one or more processors to:
receive additional network information based on performing the action; and
update a model based on the additional network information,
the model being associated with the set of rules.

13. The non-transitory computer-readable medium of claim 8, where the one or more instructions, when executed by the one or more processors, further cause the one or more processors to:
determine, based on the network information, geolocation information associated with the second set of user devices; and
determine the action to be performed based on the geolocation information associated with the second set of user devices.

14. The non-transitory computer-readable medium of claim 8, where the action includes automatically updating a social media account.

15. A method, comprising:
receiving, by a device, information associated with content that is to be provided to a first set of user devices;
receiving, by the device, information associated with a set of rules that identifies a set of conditions for providing the content to the first set of user devices;
receiving, by the device, network information associated with a second set of user devices that are different than the first set of user devices;
determining, by the device, that at least one condition, of the set of conditions identified in the set of rules, is satisfied based on the network information associated with the second set of user devices;
determining, by the device and using a machine learning model, an action, associated with the content, to be performed utilizing a particular channel based on determining that the at least one condition is satisfied based on the network information,
where determining the action associated with the content to be performed comprises:
inputting a set of parameters into the machine learning model,
the set of parameters including one or more of:
the network information,
demographic information, or
geographic information,
determining an output of the machine learning model,
the output to identify the content to optimize a campaign by utilizing the particular channel to perform the action;
performing, by the device, the action utilizing the particular channel to provide the content based on determining the action to be performed; and
training, by the device, the machine learning model by utilizing feedback information associated with network data based on the action.

16. The method of claim 15, where the network information includes at least one of:
a set of other content received by the second set of user devices; or
a set of webpages received by the second set of user devices.

17. The method of claim 15, further comprising:
determining, based on the network information, a demographic associated with the second set of user devices; and
determining the action to be performed based on the demographic associated with the second set of user devices.

18. The method of claim 15, further comprising:
receiving information associated with a result of the action; and
updating the set of rules based on the information associated with the result of the action.

19. The method of claim 15, further comprising:
determining a geolocation of the first set of user devices; and
performing the action, associated with the content, based on the geolocation of the first set of user devices.

20. The method of claim 15, where the action includes at least one of:
sending a short message service message;
providing an email message; or
updating an account.

* * * * *